(12) United States Patent
Chang et al.

(10) Patent No.: US 10,029,524 B2
(45) Date of Patent: Jul. 24, 2018

(54) TOW HOOK MOUNTING STRUCTURE FOR USE WITH VEHICLE HAVING CURVED FRAME

(71) Applicant: Ford Global Technologies, LLC, Dearborn, MI (US)

(72) Inventors: Jungmao Michael Chang, Novi, MI (US); Daniel J. McCarthy, Northville, MI (US); Marwan Ahmad Elbkaily, Canton, MI (US); John Martin Knittel, Canton, MI (US); Viktor Kostrominov, Melvildale, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 29 days.

(21) Appl. No.: 15/228,755

(22) Filed: Aug. 4, 2016

(65) Prior Publication Data
US 2018/0037075 A1   Feb. 8, 2018

(51) Int. Cl.
*B60D 1/24*   (2006.01)
*B60D 1/48*   (2006.01)

(52) U.S. Cl.
CPC ............... *B60D 1/244* (2013.01); *B60D 1/48* (2013.01)

(58) Field of Classification Search
CPC .................................................. B60D 1/244
See application file for complete search history.

(56) References Cited

U.S. PATENT DOCUMENTS

| | | | | |
|---|---|---|---|---|
| 6,659,518 B2 * | 12/2003 | Ponsonnaille | ......... | B60D 1/488 293/102 |
| 7,290,783 B2 * | 11/2007 | Dornbos | ................ | B60D 1/143 280/486 |
| 7,527,327 B2 * | 5/2009 | Aghssa | .................. | B60D 1/243 296/187.11 |
| 7,758,060 B2 * | 7/2010 | Lopez | .................... | B60D 1/488 280/495 |
| 7,775,546 B2 | 8/2010 | Asjad | | |
| 7,845,661 B2 | 12/2010 | Kondou et al. | | |
| 8,419,040 B2 | 4/2013 | Ando | | |

(Continued)

FOREIGN PATENT DOCUMENTS

CN   1689850 A1   11/2005
JP   0632255      2/1994
(Continued)

*Primary Examiner* — Kevin Hurley
(74) *Attorney, Agent, or Firm* — LeClairRyan

(57) ABSTRACT

The disclosed inventive concept provides a robust tow hook mounting structure for use with vehicles having curved frames in which the tow hook remains fixed to the vehicle during a front end impact event. The structure includes weld nuts aligned in a vehicle longitudinal direction. A frame reinforcement to which the tow hook is attached is welded to the front tip of the curved frame. Mounting bolts are aligned in the longitudinal direction of the vehicle to secure the tow hook and the tow hook reinforcement to the frame weld nuts. The shear capacity of the mounting bolts is higher than the towing capacity and the crash load during an impact event. The structure generates high bending moments that trigger favorable bending deformations in the kick down area of the frame in which the structure functions as a backup arrangement in an impact event and reduces high crash pulses.

7 Claims, 7 Drawing Sheets

(56) References Cited

U.S. PATENT DOCUMENTS 9,090,137 B2 *  7/2015  Blunier .................. B60D 1/247
9,505,280 B2 * 11/2016  Furukawa ................ B60D 1/06

FOREIGN PATENT DOCUMENTS

| JP | 2007237867 | 9/2007 |
| JP | 2011168077 | 9/2011 |
| JP | 5501892 | 5/2014 |
| WO | 2012168658 | 12/2012 |

* cited by examiner

TOW HOOK MOUNTING STRUCTURE FOR USE WITH VEHICLE HAVING CURVED FRAME

TECHNICAL FIELD

The disclosed inventive concept relates to accessories for vehicles and, more particularly, to tow hooks for vehicles. Specifically, the disclosed inventive concept relates to a non-detachable, robust tow hook mounting structure for the curved frame of a vehicle. The non-detachable, robust tow hook mounting structure of the disclosed inventive concept is able to meet towing strength requirements and generate controlled bending deformations in the front frame of the vehicle to reduce high crash pulses in high speed, full-frontal NCAP mode. Accordingly, the disclosed inventive concept is directed to a tow hook mounting strategy that reduces high crash pulses at the end of frontal impact event for vehicle having a curved frame.

BACKGROUND OF THE INVENTION

A wide variety of vehicles including trucks, particularly pickup trucks and sport utility vehicles, have one or more tow hooks for towing or pulling purposes. The tow hooks are typically mounted on the vehicle's front rail and extend through apertures formed in the vehicle's bumper or fascia to project outwards. As an alternative arrangement, tow hooks project from beneath the bumper in certain types of vehicles so as to not detract from the vehicle's outer aesthetics.

Tow hooks are typically formed from a solid material, such as steel. The typical tow hook assembly includes a backing plate to which the tow hook is attached. The backing plate is shaped to receive the tow hook. Conventionally, the backing plate is detachably fixed to the front rail of the vehicle.

According to known tow hook architecture, the tow hook mounting structure is designed to achieve towing strength mainly in tension and to purposefully detach in a high end impact event. The purpose of allowing the tow hook to detach during such a impact event is to ensure that the axial crush of the frame front horn, thereby effectively absorbing crash energy during the impact event.

While this approach generally provides satisfactory results for many frame structures, the axial crush is not attainable for a curved vehicle frame. The curved frame is frequently essential for vehicle compatibility and package requirements. Accordingly, energy absorption during an impact event has to be manage through bending deformation, particularly in the area of a backup structure where high crash pulses are often observed due to a reduction of effective mass caused by the engine being stationary at the later stage of the impact event.

Accordingly, known approaches to tow hook architecture do not produce satisfactory results, particularly when used in conjunction with a vehicle having a curved frame. As in so many areas of vehicle technology, there is always room for improvement related to tow hook systems for a vehicle.

SUMMARY OF THE INVENTION

The disclosed inventive concept provides a robust tow hook mounting structure for use with vehicles having curved frames in which the tow hook remains fixed to the vehicle during a front end impact event. The inventive concept is particularly directed to tow hook architecture that can manage bending deformations of a curved frame in an impact event. The tow hook of the disclosed inventive concept is configured so as to compatibly achieve both a desired towing strength and crushing properties by fixing the tow hook to the vehicle frame in corresponding loading directions. The general objective of having the tow hook remain fixed to the vehicle in a front impact event is to ensure an axial crush at the frame, thereby effectively achieving a desired level of absorption of crash energy can be attained. Particularly, the inventive tow hook mounting structure is configured so as to generate high bending moments that trigger favorable bending deformations in the kick down area of the frame in which the structure functions as a backup arrangement in an impact event and reduces high crash pulses.

The disclosed inventive concept includes a robust tow hook mounting structure attached to a curved frame. The tow hook mounting structure includes weld nuts that are aligned in a vehicle longitudinal direction for use with a greater number of attachment bolts than are used in conventional tow hook attachment configurations. The attachment bolts are aligned in the longitudinal direction of the vehicle. The bolts have a greater diameter and possess a higher shear strength than conventional bolts. Particularly, the shear capacity of the selected bolts is higher than both the towing capacity and the collision crash load of the vehicle. The frame reinforcement to which the tow hook is attached is welded to the front tip of the curved frame. The frame reinforcement includes holes for mounting bolts for threading into the weld nuts.

According to the architecture of the disclosed inventive concept, the combined bending capacity of the curved frame and frame reinforcement is enough to support the offset load at the tow hook to overcome the bending capacity and to initiate bending deformation at the frame kick down in the back up structure.

In a front collision, this architecture thus allows the robust tow hook mounting structure to initiate the bending deformation in the back up structure of the curved frame early in the impact event as compared with no deformation in a similar event in tow hooks according to the prior art in which the tow hook is detached in an impact event. According to the tow hook architecture of the disclosed inventive concept, the initial bending in the back up structure guides the curved frame to undergo significant bending deformation in the later stage of the impact event, thereby reducing crash pulses.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

Figure 1:
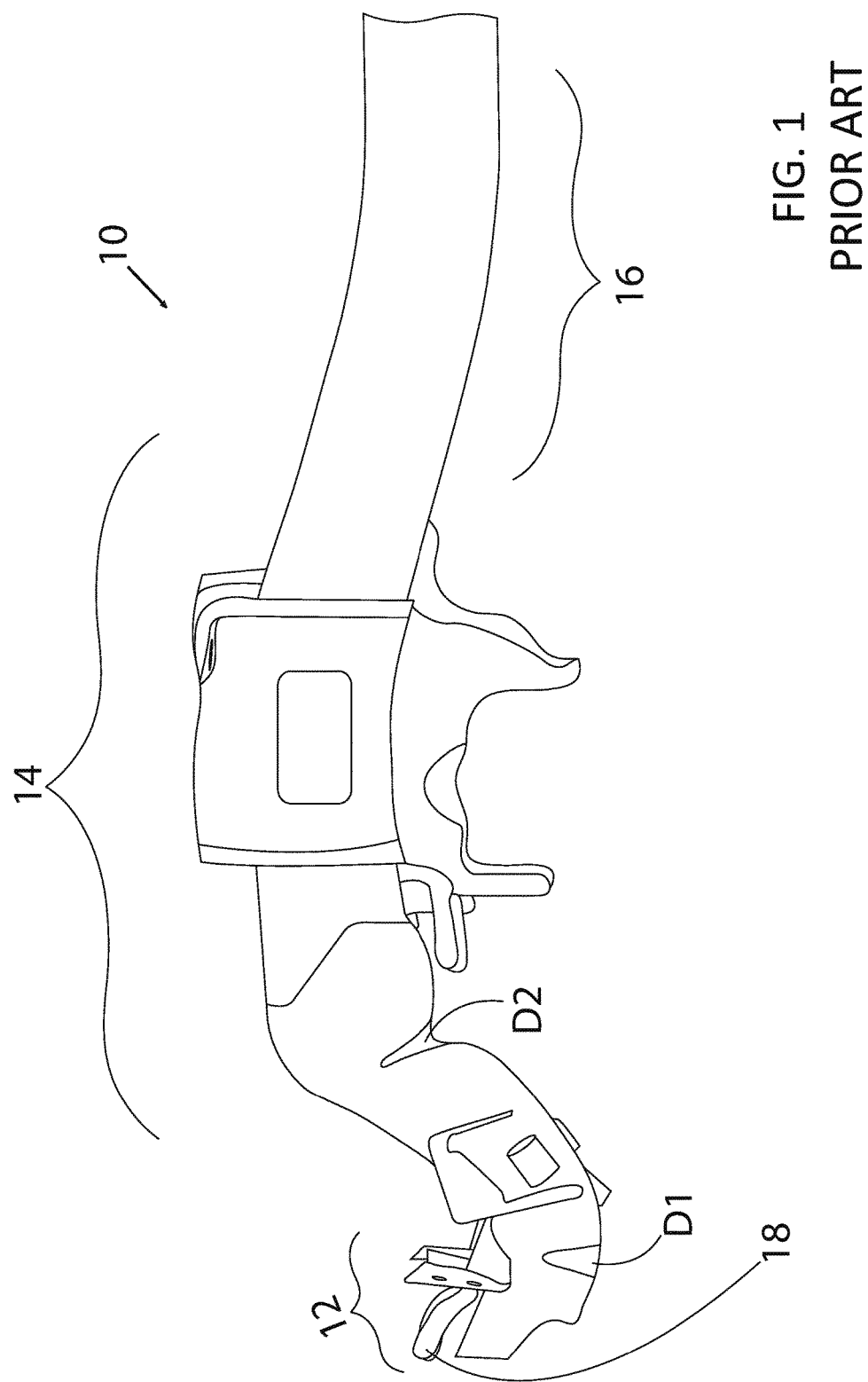
FIG. 1 is a side view of a tow hook being detached from a curved frame according to the prior art in the early stage of a front end impact event.

In the following figures, the same reference numerals will be used to refer to the same components. In the following description, various operating parameters and components are described for different constructed embodiments. These specific parameters and components are included as examples and are not meant to be limiting.

Figure 2:
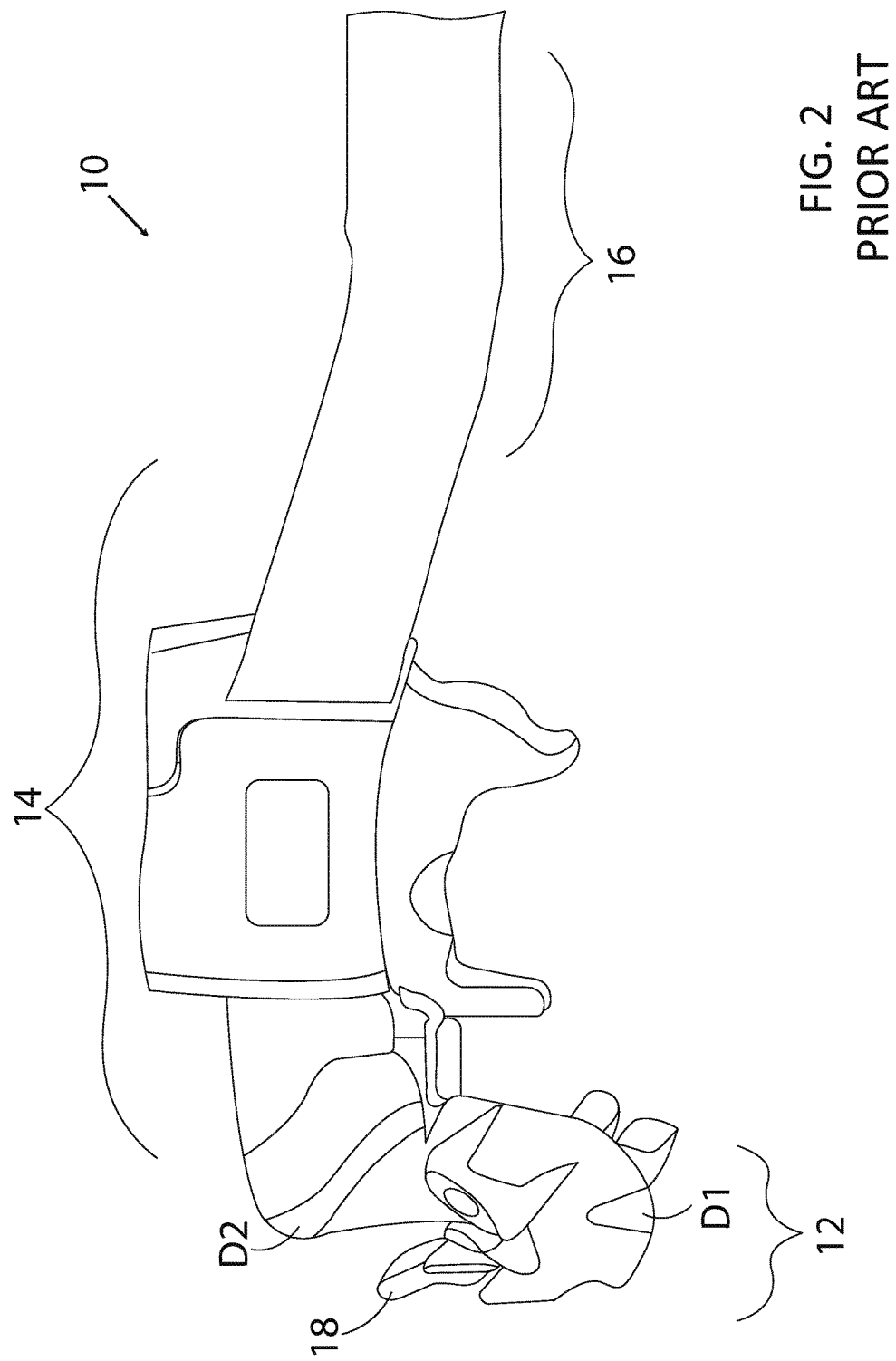
FIG. 2 is a view similar to that of FIG. 1 illustrating a tow hook being detached from a curved frame according to the prior art at a later stage of the front end impact event in which the tow hook has become substantially detached from the frame.
Figure 6:
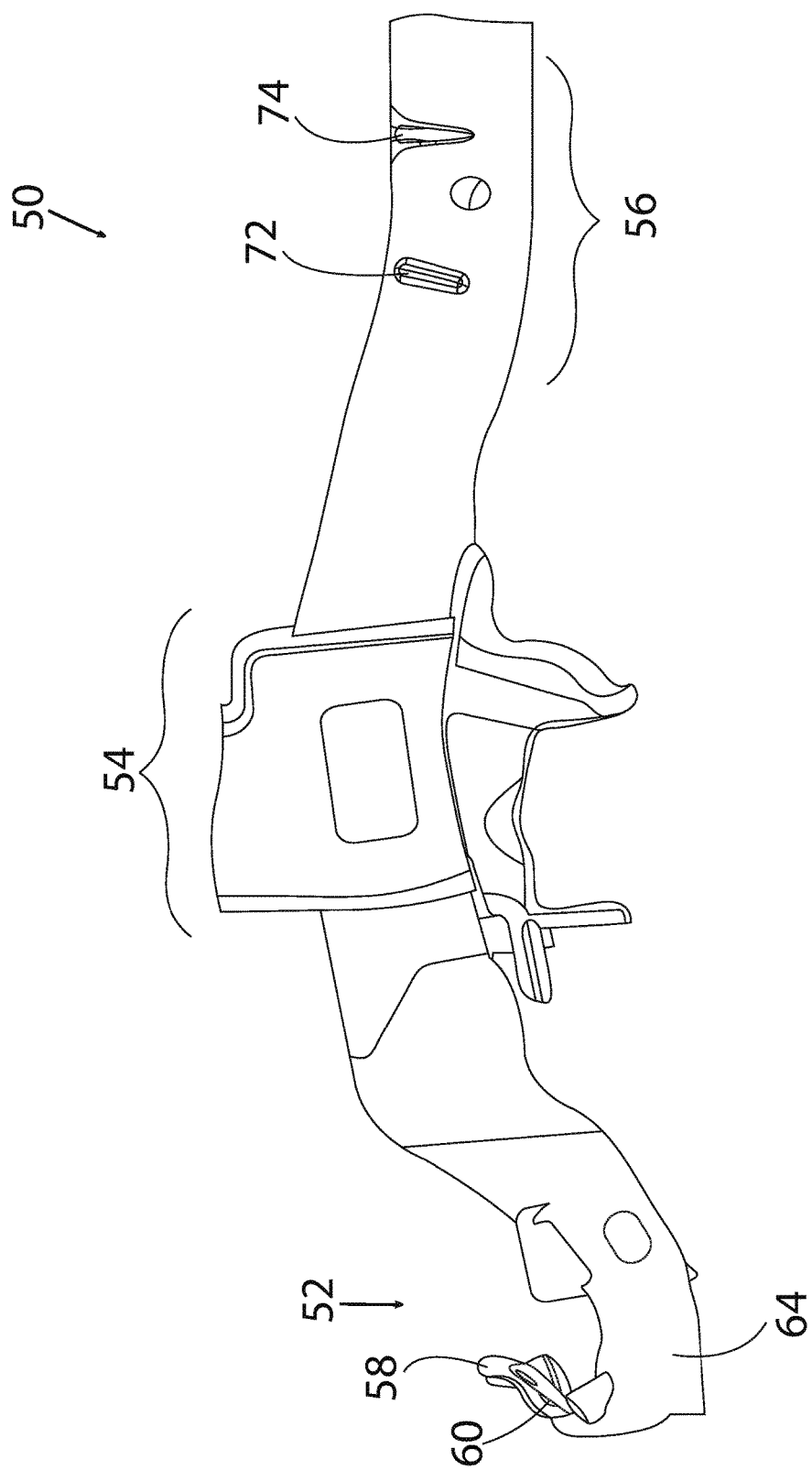
FIG. 6 is a side view of the tow hook and curved frame architecture of the disclosed inventive concept illustrated during the initial stage of a front end impact event.
Figure 7:
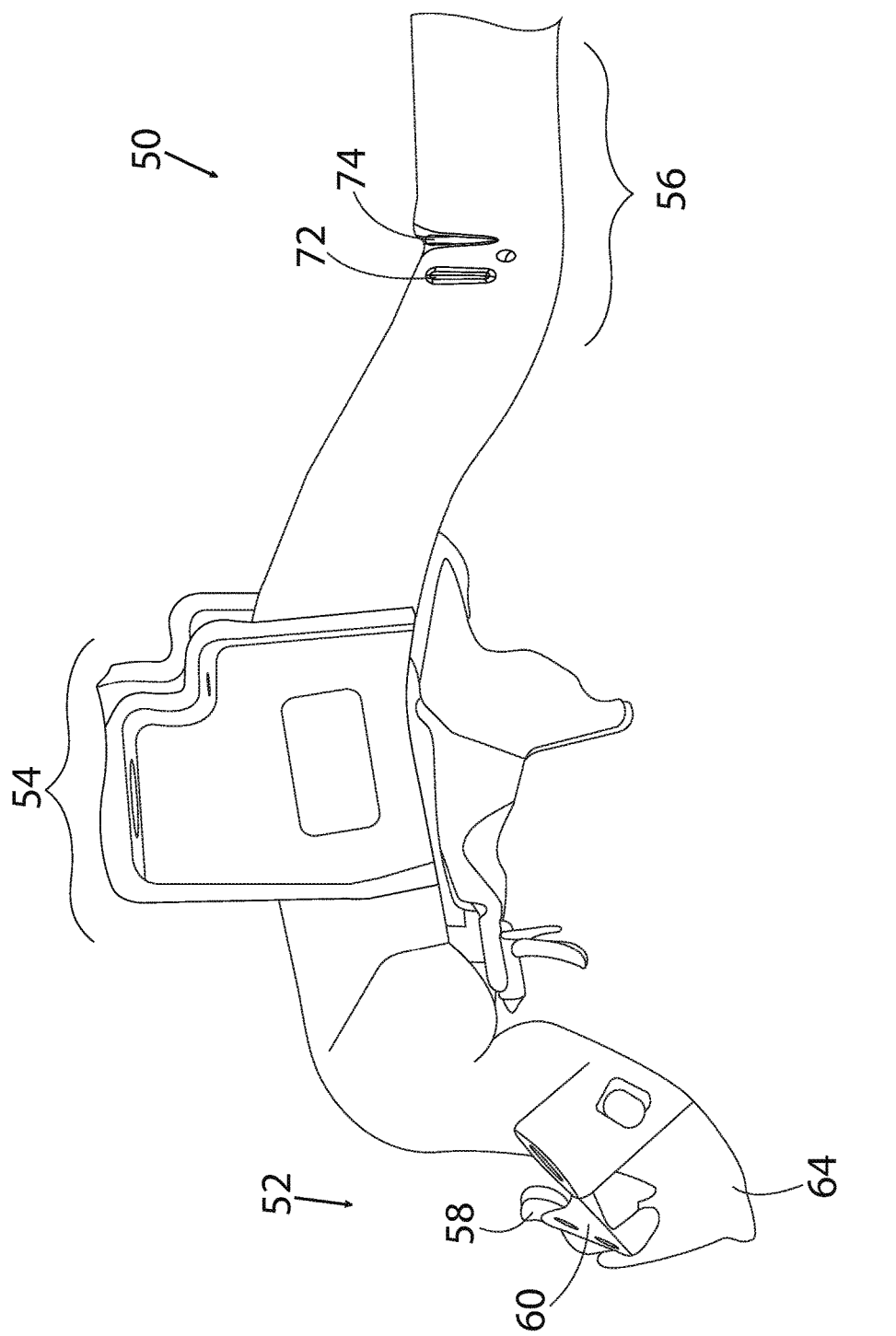
FIG. 7 is a view similar to that of FIG. 6 but illustrating the tow hook and curved frame architecture at a later stage of the front end impact event.

The accompanying figures and the associated description illustrate a tow hook arrangement in a front end impact according to the prior art and a tow hook arrangement of the disclosed inventive concept. Particularly, FIGS. 1 and 2 illustrate a tow hook arrangement according to the prior art and FIGS. 3 through 7 illustrate a tow hook arrangement according to the disclosed inventive concept. The advantageous behavior of the disclosed inventive concept during a front end impact event is illustrated in FIGS. 6 and 7.

Referring to FIGS. 1 and 2, a tow hook arrangement according to the prior art is shown, generally illustrated as 10. The tow hook arrangement 10 includes a tow hook assembly 12, a frame portion 14, and a backup structure 16. The tow hook assembly 12 includes a detachable tow hook 18 that is detachably attached to the frame portion 14 by a method of attachment whereby the tow hook 18 is allowed to become detached from the frame portion 14 in a front end impact event. Because the detachable tow hook 18 is allowed to become detached from the frame in a front end impact event, uncontrolled deformation is allowed to occur.

Two stages of a front end impact event with a vehicle involving the prior art tow hook arrangement 10 according to the prior art are illustrated in FIGS. 1 and 2. Referring to FIG. 1, the early stage of a front end impact event involving the tow hook arrangement 10 of the prior art is shown. As illustrated, two deformations, D1 and D2, have arisen and are fully concentrated in the region of the tow hook assembly 12. None of the impact energy has been distributed to either the frame portion 14 or to the backup structure 16.

Referring to FIG. 2, the tow hook arrangement 10 according to the prior art is shown at a later stage of the front impact event. As shown, the deformations D1 and D2 have become more exaggerated and the tow hook assembly 12 has become substantially detached from the frame portion 14. Again, none of the impact energy has been distributed to either the frame portion 14 or to the backup structure 16.

The tow hook arrangement of the disclosed inventive concept overcomes the challenges faced by the prior art by providing an architecture whereby deformation during a front impact event is controlled given that the tow hook assembly cannot become detached from the frame during the impact event, thus enabling the desired structural deformation pattern.

Figure 3:
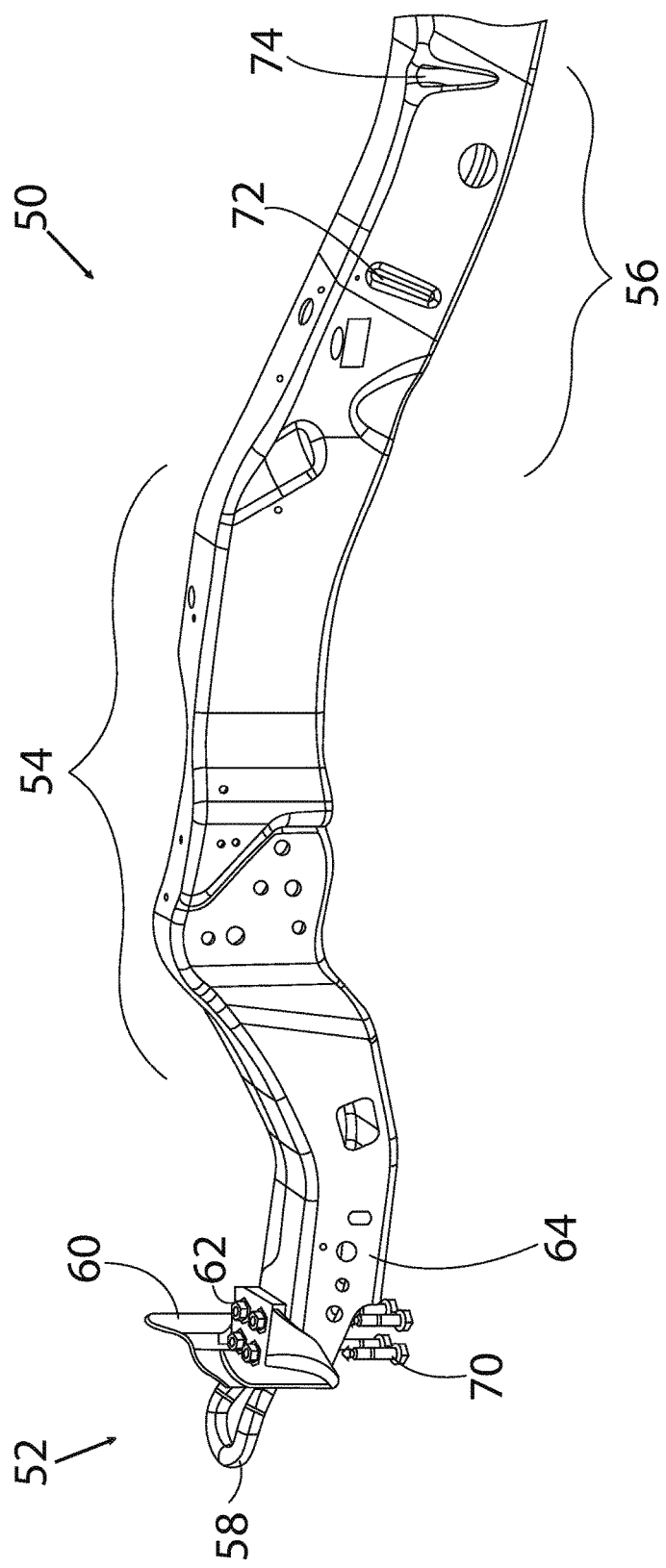
FIG. 3 is a perspective view of a tow hook attached to a curved frame according to the disclosed inventive concept.
Figure 4:
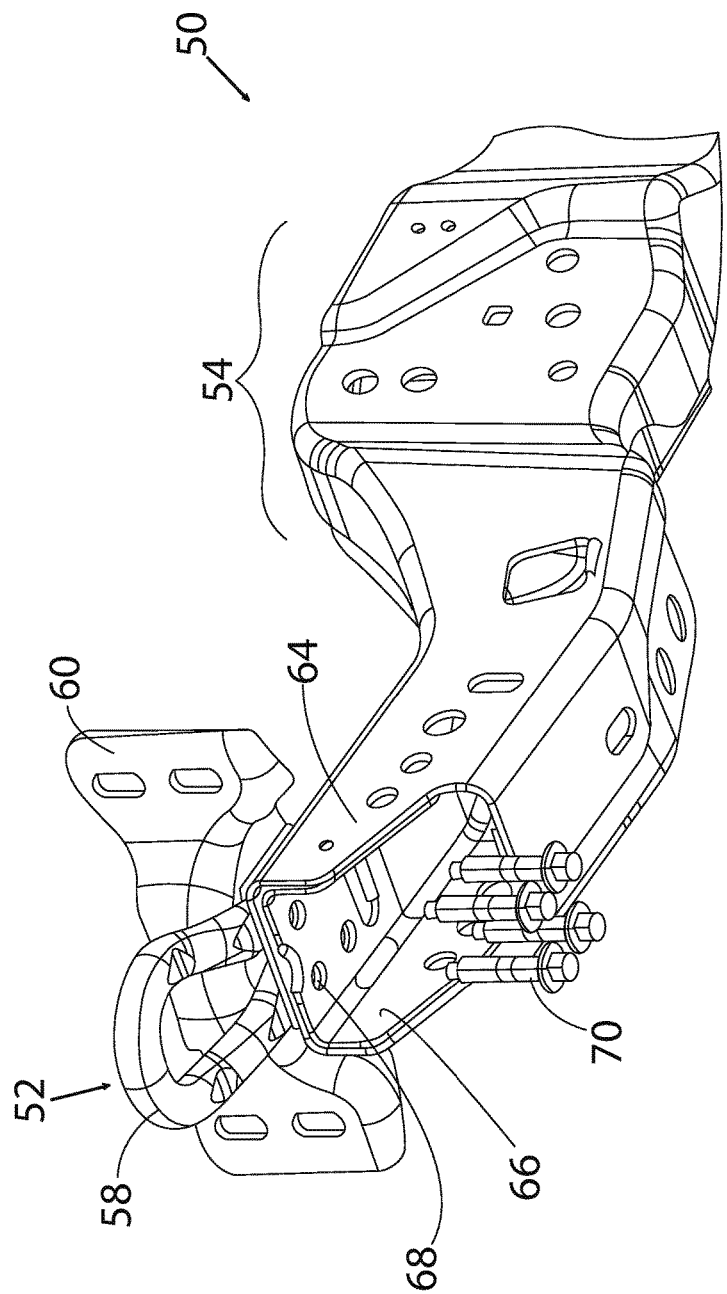
FIG. 4 is a view similar to that of FIG. 3 but viewed from the underside.
Figure 5:
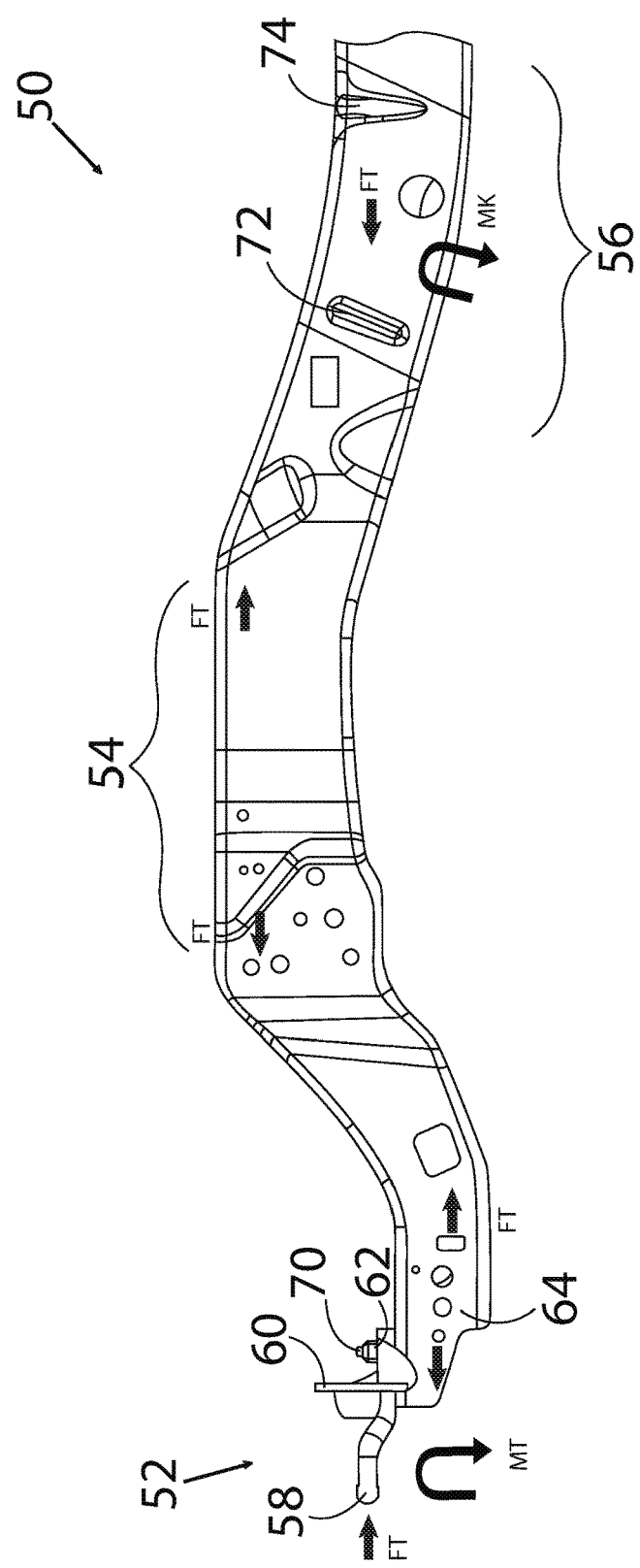
FIG. 5 is a view similar to that of FIG. 3 but viewed from the side.

Referring to FIGS. 3 through 5, a tow hook arrangement according to the disclosed inventive concept is generally illustrated as 50. The tow hook arrangement 50 includes a tow hook assembly 52, a curved frame portion 54, and a backup structure 56. It is to be understood that the shape and size of the tow hook arrangement 50 as illustrated are only suggested as other shapes and sizes are possible without deviating from the scope and spirit of the disclosed inventive concept.

The tow hook assembly 52 includes a tow hook 58 attached to a tow hook support plate 60. Attachment of the tow hook 58 to the tow hook support plate 60 may be made by any of several methods including, without limitation, welding. The tow hook support plate 60 includes a plurality of at least four bolt attachment nuts 62 which, preferably, are weld nuts that are permanently fixed to the tow hook support plate 60. The bolt attachment nuts 62 are aligned in a vehicle longitudinal direction.

The curved frame portion 54 includes a front tip 64. As illustrated in FIG. 4, a frame reinforcement 66 is welded to the front tip 64 of the curved frame portion 54. Formed beneath the bolt attachment nuts 62 and through the frame reinforcement 66 is a plurality of fastener holes 68.

The tow hook support plate 60 is non-detachably attached to the front tip 64 by a fastener arrangement with sufficient shear strength for towing and crash loads. Particularly, a plurality of full shank attachment bolts 70 is attached to the bolt attachment nuts 62. The number of attachment bolts 70 is equal to the number of bolt attachment nuts 62 which, preferably but not absolutely, is at least four, which is an improvement over the more typical number of three attachment fasteners, thereby adding to the overall robustness of the tow hook mounting structure of the disclosed inventive concept. In addition, the size of each of the attachment bolts 70 is at least M14, also a substantial improvement over the typical prior art attachment bolt of M12. The attachment bolts 70 are also particularly selected based on their shear capacity which is higher than the towing capacity of the vehicle and the crash load of the vehicle during a potential impact event. Like the bolt attachment nuts 62, the attachment bolts 70 are aligned in a vehicle longitudinal direction.

The backup structure 56 includes bend initiators such as a bend initiator slot 72 and bend initiator channel 74. Other bend initiators are known, and thus the illustration of the bend initiator slot 72 and the bend initiator channel 74 is intended as being suggestive and not limiting.

The offset load and bending moments associated with the tow hook arrangement 50 of the disclosed inventive concept is illustrated in FIG. 5. With reference thereto, the combined bending capacity (Mt) of the frame and the frame reinforcement is enough to support the offset load (Ft) at the tow hook 58 to overcome the bending capacity (Mk) and initiate bending deformations at the frame kick down in back up structure 56.

During a front impact event, the tow hook mounting structure that includes the tow hook support plate 60 is able to initiate the bending deformation of the bend initiators (such as, but not limited to, the bend initiator slot 72 and the bend initiator channel 74) in the backup structure 56 adjacent the curved frame portion 54 early in a crash event. This initial deformation is illustrated in FIG. 6 in which the tow hook support plate 60 remains attached to the front tip 64 of the curved frame portion 54. FIG. 7 illustrates the tow hook arrangement 50 during a later stage of the impact event whereby the bend initiator slot 72 and the bend initiator channel 74 have become distressed, demonstrating how the architecture of the tow hook arrangement 50 guides the curved frame to have significant bending deformations in the later stage of crash, thereby reducing crash pulses.

The disclosed inventive concept as set forth above overcomes the challenges faced by known tow hook arrangements. The arrangement discussed above and set forth in FIGS. 3 through 7 is of relatively low cost to produce and thus helps to keep manufacturing expenses to a minimum. In addition, the illustrated and discussed arrangement is relatively easy to install on existing vehicle frames. Finally, and perhaps most important, the arrangement presented herein provides a high degree of safety for the operator and the vehicle itself.

One skilled in the art will readily recognize from such discussion, and from the accompanying drawings and claims that various changes, modifications and variations can be made therein without departing from the true spirit and fair scope of the invention as defined by the following claims.

What is claimed is:

1. A tow hook architecture for a vehicle frame comprising:
   a tow hook portion including a tow hook, a tow hook support plate to which said tow hook is attached, a frame reinforcement fixed to the frame and bolts for attaching said tow hook support plate to the vehicle frame;
   a deformable backup structure that includes a bend initiator; and
   an intermediate curved portion between said tow hook portion and said backup structure.

2. The tow hook architecture for a vehicle frame of claim 1, wherein the vehicle has a long axis and wherein said bolt fasteners are aligned along said long axis.

3. The tow hook architecture for a vehicle frame of claim 2, wherein said intermediate curved portion has a front tip and said frame reinforcement is attached to said front tip.

4. The tow hook architecture for a vehicle frame of claim 3, wherein said bolts are aligned along said long axis of the vehicle.

5. The tow hook architecture for a vehicle frame of claim 3, wherein said bend initiator is selected from at least one of the group consisting of a slot and a channel.

6. The tow hook architecture for a vehicle frame of claim 3, wherein said deformable backup structure has a long axis and wherein said bend initiator is substantially perpendicular to said long axis of said backup structure.

7. The tow hook architecture for a vehicle frame of claim 2 further including weld nuts attached to said tow hook support plate for receiving said fasteners, said weld nuts being aligned along said long axis.

* * * * *